US012809115B2

(12) United States Patent
Suginome et al.

(10) Patent No.: US 12,809,115 B2
(45) Date of Patent: Nov. 24, 2026

(54) LENS UNIT AND CAMERA MODULE

(71) Applicant: MAXELL, LTD., Otokuni-gun (JP)

(72) Inventors: Takayuki Suginome, Otokuni-gun (JP); Akira Inaba, Otokuni-gun (JP); Yusuke Baba, Otokuni-gun (JP); Hideki Shinohara, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 1180 days.

(21) Appl. No.: 17/606,339

(22) PCT Filed: Apr. 17, 2020

(86) PCT No.: PCT/JP2020/016946
§ 371 (c)(1),
(2) Date: Oct. 25, 2021

(87) PCT Pub. No.: WO2020/218212
PCT Pub. Date: Oct. 29, 2020

(65) Prior Publication Data

US 2022/0196963 A1 Jun. 23, 2022

(30) Foreign Application Priority Data

Apr. 25, 2019 (JP) ................................ 2019-083706

(51) Int. Cl.
*G02B 7/02* (2021.01)
*G02B 1/115* (2015.01)
(Continued)

(52) U.S. Cl.
CPC .............. *G02B 7/028* (2013.01); *G02B 1/115* (2013.01); *G02B 1/14* (2015.01); *G02B 7/021* (2013.01);
(Continued)

(58) Field of Classification Search
CPC ........... G02B 7/028; G02B 1/14; G02B 7/021
See application file for complete search history.

(56) References Cited

U.S. PATENT DOCUMENTS

2018/0239105 A1 8/2018 Lee et al.

FOREIGN PATENT DOCUMENTS

EP 2 711 741 A1 3/2014
JP S56-117701 A 9/1981
(Continued)

OTHER PUBLICATIONS

WO 2020202874, translation (Year: 2020).*
(Continued)

*Primary Examiner* — Wen Huang
(74) *Attorney, Agent, or Firm* — Oliff PLC

(57) ABSTRACT

A lens unit and a camera module are provided which are capable of warming the lens surface and realizing a quick snow melting effect without impairing the antireflection characteristics of the antireflection film. The lens unit has lens heating means which includes: i) a transparent conductive film provided on a lens surface facing the object side of the lens located closest to the object side, the lens constituting the lens group; ii) at least a pair of electrodes electrically connected to the transparent conductive film; wherein an electric current is caused to flow to the transparent conductive film by applying a voltage between the electrodes to generate Joule heat on the lens surface. The lens unit further includes an antireflection film provided to cover the lens heating means.

8 Claims, 5 Drawing Sheets

(51) Int. Cl.
*G02B 1/14* (2015.01)
*B60R 11/00* (2006.01)
*B60R 11/04* (2006.01)

(52) U.S. Cl.
CPC ....... *B60R 2011/0003* (2013.01); *B60R 11/04* (2013.01)

(56) References Cited

FOREIGN PATENT DOCUMENTS

| | | | | |
|---|---|---|---|---|
| JP | H01-191102 | A | | 8/1989 |
| JP | H01-191118 | A | | 8/1989 |
| JP | 2013-231993 | A | | 11/2013 |
| JP | 2019-060956 | A | | 4/2019 |
| WO | 2012/157072 | A1 | | 11/2012 |
| WO | WO-2020202874 | A1 | * | 10/2020 |

OTHER PUBLICATIONS

Jul. 7, 2020 International Search Report issued in International Patent Application No. PCT/JP2020/016946.
Jul. 7, 2020 Written Opinion of the International Searching Authority issued in International Patent Application No. PCT/JP2020/016946.
Dec. 6, 2022 Office Action issued in Japanese Patent Application No. 2019-083706.
Feb. 8, 2023 Office Action issued in Chinese Patent Application No. 202080030358.2.

* cited by examiner

[Fig. 1]
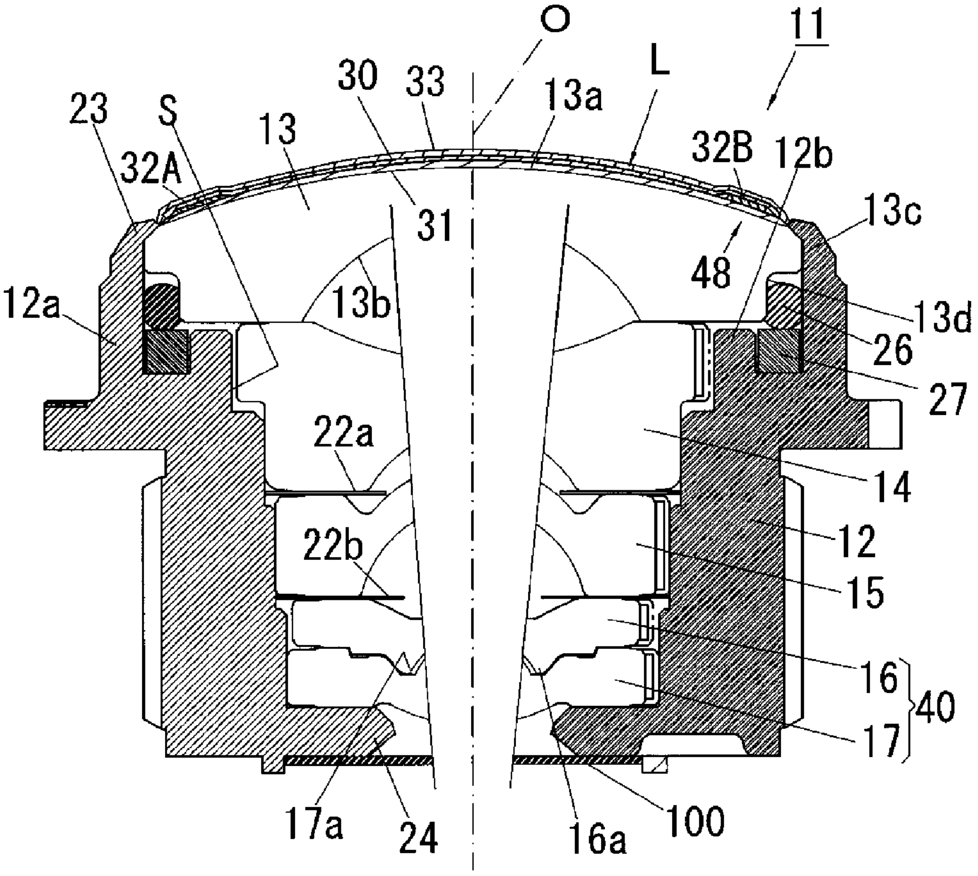

[Fig. 2]
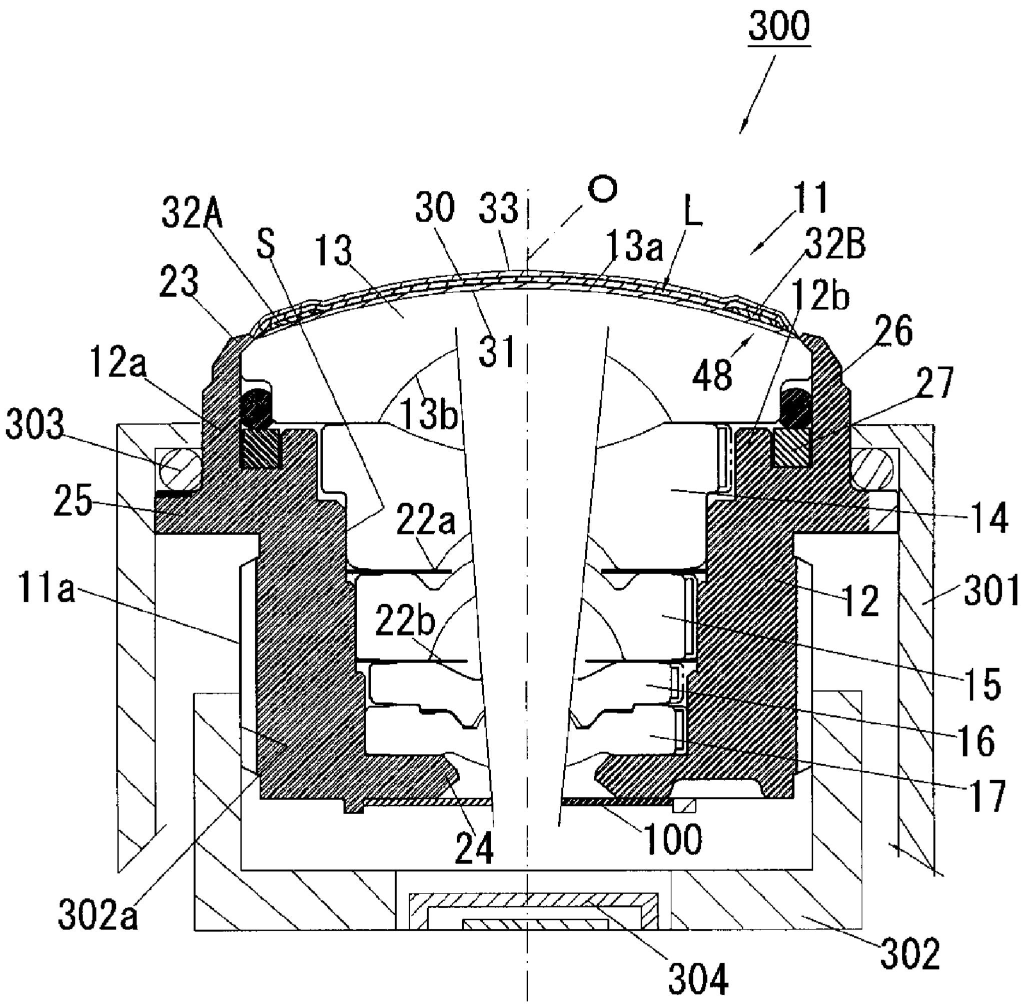

[Fig. 4]
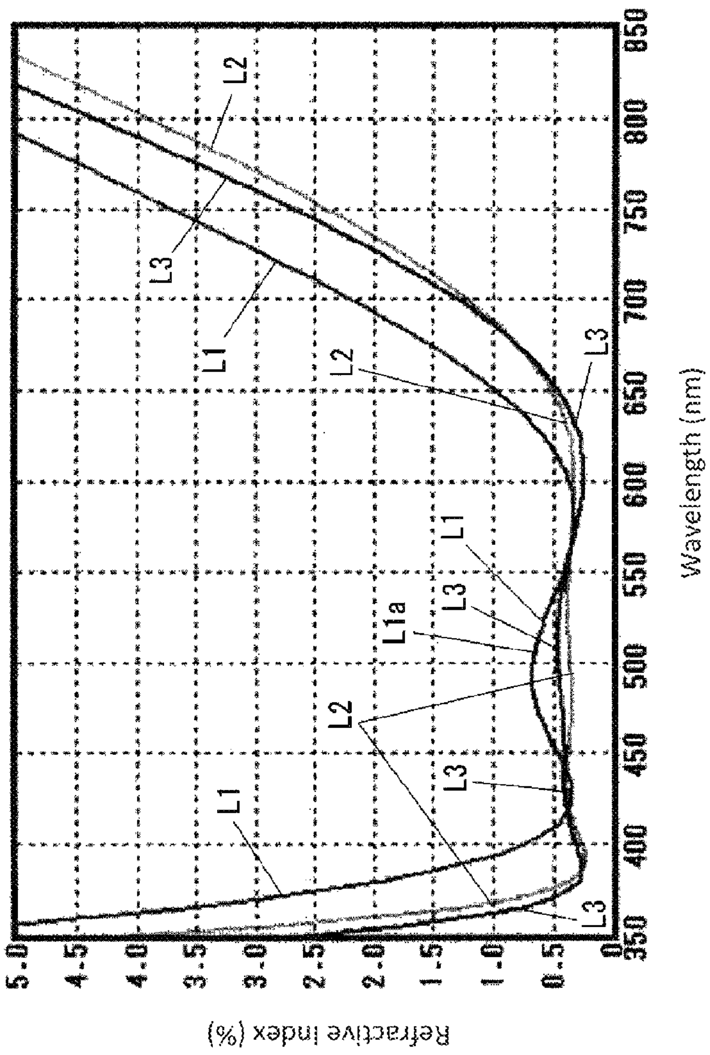

[Fig. 3]

| graph | L 2 | | | L 1 | | | L 3 | | |
|---|---|---|---|---|---|---|---|---|---|
| | single laminated structure of antireflection film | | | general film laminated structure | | | improved film laminated structure | | |
| | material | refractive index | film thickness | material | refractive index | film thickness | material | refractive index | film thickness |
| glass | TAF1 | 1.77 | – | TAF1 | 1.77 | – | TAF1 | 1.77 | – |
| 1 | AL2O3 | 1.64 | 33.40 | AL2O3 | 1.64 | 25.48 | ITO film | 1.74 | 25.00 |
| 2 | LaTiO3 | 2.10 | 18.10 | LaTiO3 | 2.10 | 9.47 | AL2O3 | 1.64 | 29.49 |
| 3 | AL2O3 | 1.64 | 38.35 | AL2O3 | 1.64 | 49.50 | LaTiO3 | 2.10 | 15.99 |
| 4 | LaTiO3 | 2.10 | 61.49 | LaTiO3 | 2.10 | 29.82 | AL2O3 | 1.64 | 37.99 |
| 5 | AL2O3 | 1.64 | 7.09 | AL2O3 | 1.64 | 23.83 | LaTiO3 | 2.10 | 62.94 |
| 6 | LaTiO3 | 2.10 | 51.66 | LaTiO3 | 2.10 | 49.29 | AL2O3 | 1.64 | 6.26 |
| 7 | SiO2 | 1.45 | 86.51 | SiO2 | 1.45 | 8.96 | LaTiO3 | 2.10 | 48.65 |
| 8 | – | – | – | ITO film | 1.74 | 25.00 | SiO2 | 1.45 | 85.39 |
| 9 | – | – | – | SiO2 | 1.45 | 65.54 | – | – | – |
| TTL | – | – | 296.60 | – | – | 286.89 | | – | 311.71 |

[Fig. 5]
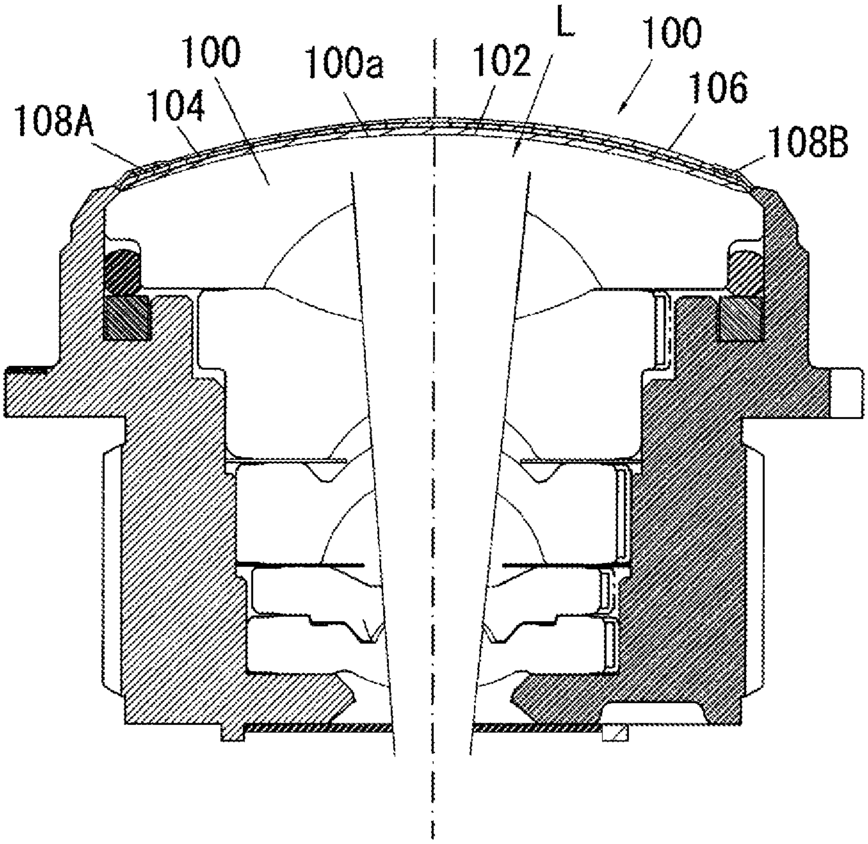

LENS UNIT AND CAMERA MODULE

TECHNICAL FIELD

The present invention relates to a lens unit and a camera module, and more particularly to a lens unit and a camera module that can be provided in an in-vehicle camera mounted on a vehicle such as an automobile.

BACKGROUND ART

Recently, in-vehicle cameras have been installed in automobiles to support parking and to prevent collisions by performing image recognition. Further, attempts have been made to apply the in-vehicle cameras to vehicle's automatic driving. In addition, a camera module of such an in-vehicle camera generally includes a lens group in which a plurality of lenses are arranged along an optical axis, a lens barrel for accommodating and holding the lens group, and a lens unit having an aperture member arranged between at least one pair of lenses among the lens group (see, for example, Patent Document 1).

The lens unit (camera module) having the above configuration is not necessarily to be limited to an in-vehicle camera, but can also be used in various optical devices. Particularly, when the lens unit is exposed to an outside environment in an extremely cold area, since it is assumed that lens will be frozen or snow will be attached to the lens, the lens unit is generally equipped with a snow melting function or the like. Specifically, for example, a cover glass equipped with a heater is provided in front of a lens that is located closest to the object side in the lens group, or a fan is attached for melting the snow.

CITATION LIST

Patent Document

Patent Document 1: Japanese Unexamined Patent Publication No. 2013-231993

SUMMARY OF INVENTION

Technical Problems

However, regarding a structure in which a cover glass with a heater is to be provided in front of the lens located closest to the object side to ensure a snow melting function or in a structure in which a fan is to be attached, it is usual to newly install a cover glass with a heater or a fan. As a result, not only will the overall manufacturing cost increase, but it will also be necessary to ensure a new space for installing a heater-equipped cover glass or a fan-equipped cover glass, resulting in an increase in the size of the entire device such as a camera. Further, since snow melting of the lens is indirectly performed by a heater or a fan located away from the lens surface, it is difficult to melt snow in a short time, especially when the lens is a glass lens having a low thermal conductivity.

Accordingly, it has been considered that a transparent conductive film such as indium tin oxide (ITO) having an electric resistance can be provided on the surface of a lens located closest to the object side of the lens group, and then an electric current is caused to flow to the transparent conductive film through electrodes, so that Joule heat is generated on the surface of the lens, thereby producing an effect of directly heating the lens surface.

However, such a transparent conductive film may cause one problem when used in combination with an antireflection film. Namely, when an antireflection film is provided together with the transparent conductive film on the surface of the lens located closest to the object side of the lens group, if the transparent conductive film is positioned on the outer surface of the lens located close to the outside air in order to enhance the snow melting effect, the following problems will occur. Namely, for example, if the transparent conductive film is positioned on the antireflection film to cover the antireflection film, the reflectance of the antireflection film will become higher than the reflectance of the antireflection film itself (when not covered by the transparent conductive film), meaning that its antireflection characteristic will be deteriorated.

The present invention has been accomplished in view of the above circumstances, and an object of the present invention is to provide a lens unit and a camera module capable of warming the lens surface and effecting a quick snow melting without impairing the antireflection characteristic of an antireflection film.

Solution to Problems

In order to solve the above problems, the present invention provides a lens unit including i) a lens group in which a plurality of lenses are arranged along optical axes of the lenses and ii) a lens barrel in which the lens group is accommodated, said lens unit comprising:

lens heating means which includes: i) a transparent conductive film provided on a lens surface facing the object side of the lens located closest to the object side, said lens constituting the lens group; ii) at least a pair of electrodes electrically connected to the transparent conductive film; wherein an electric current is caused to flow to the transparent conductive film by applying a voltage between the electrodes to generate Joule heat on the lens surface; and an antireflection film provided to cover the lens heating means.

The inventors of the present invention have reached the following findings. Namely, the inventors at first inspected what effect the lamination position of the transparent conductive film will have on the reflectance of the antireflection film when the transparent conductive film constituting the heating means is used together with the antireflection film. The inventors then found that when the transparent conductive film is positioned on the antireflection film to cover the antireflection film, the reflectance of the antireflection film becomes higher than the reflectance of the antireflection film itself when not covered by the transparent conductive film (It was found that the anti-reflection characteristics was deteriorated).

Specifically, at first, as shown in FIG. 5, an antireflection film 102 is provided on a lens surface 100*a* of a lens 100 located closest to the object side constituting a lens group L of the lens unit 100, and a transparent conductive film 104 is provided on the antireflection film 102. Further, a protective film 106 is provided to cover the transparent conductive film 104, while a pair of electrodes 108A, 108B electrically connected to the transparent conductive film 104 are interposed between the conductive film 104 and the protective film 106, thereby forming a general film laminated structure, which was then investigated regarding its antireflection characteristics.

More specifically, as shown in the data in the center of a table of FIG. 3 ("general film laminated structure"), on a glass lens (TAF1) 100 having a refractive index of 1.77 there is provided a laminated structure (here is a 6-layer structure) formed by alternately laminating i) an $Al_2O_3$ layer, which is the first antireflection film material having a refractive index of 1.64 and ii) an $LaTiO_3$ layer, which is the second antireflection film material having a refractive index of 2.10, higher than that of $Al_2O_3$ layer. In detail, there have been laminated an antireflection film 102 including (in the following order from below) an antireflection layer ($Al_2O_3$) having a thicknesses of 25.48 nm, an antireflection layer ($LaTiO_3$) having a thickness of 9.47 nm, an antireflection layer ($Al_2O_3$) having a thickness of 49.50 nm, an antireflection layer ($LaTiO_3$) having a thickness of 29.82 nm, and antireflection layer ($Al_2O_3$) having a thickness of 23.83 nm, an antireflection layer ($LaTiO_3$) having a thickness of 49.29 nm. Further, on the antireflection film 102 there is provided a protective film (having a thickness of 8.96 nm) 106 made of $SiO_2$ having a refractive index of 1.45. Meanwhile, on the protective film 106 there is provided, as a transparent conductive film 104, an indium tin oxide (ITO) having a refractive index of 1.74 and a thickness of 25.00 nm, further provided thereon is a protective film 106 formed of $SiO_2$ having a thickness of 65.54 nm, thereby forming a laminated structure. When the film laminated structure was optimized by performing a predetermined simulation at a predetermined light incident angle, a spectral characteristic curve L1 was obtained which is shown in the spectral characteristic diagram of FIG. 4 (that is a spectral characteristic diagram showing a relationship between refractive index (%) of the antireflection film and incident light wavelength (nm)).

As can be seen from the spectral characteristic curve L1, in this general film laminated structure in which the transparent conductive film 104 is located on the antireflection film 102, the reflectance is 1.5 or less and is not completely falling within the specified incident wavelength range (400 nm to 700 nm). Meanwhile, in the central region (450 nm to 550 nm) of the specified incident wavelength range (400 nm to 700 nm) the reflectance becomes large (having a convex portion L1*a* in which the spectral characteristic curve L1 rises with an extreme value). In addition, the data on the left side of the table in FIG. 3 ("antireflection film single laminated structure") shows the following structure. Namely, there is formed the laminated structure of the antireflection film alone from which the transparent conductive film (ITO film) 104 has been removed from the general film laminated structure, (having the following layers arranged in the following order from below, with the thickness being 33.40 nm ($Al_2O_3$), 18.10 nm ($LaTiO_3$), 38.35 nm ($Al_2O_3$)), 61.49 nm ($LaTiO_3$), 7.09 nm ($Al_2O_3$), 51.66 nm ($LaTiO_3$). The protective layer $SiO_2$ is only one layer having a thickness of 86.51 nm, and as can be seen by comparing with the spectral characteristic curve L2 of FIG. 4 obtained by performing an optimization using a predetermined simulation. Namely, the reflectance of a general film laminated structure (spectral characteristic curve L1) becomes clearly higher than the reflectance (spectral characteristic curve L2) of the antireflection film 102 alone not covered by the transparent conductive film 104. When a further optimization is performed by simulation so that the convex portion L1*a* of the spectral characteristic curve L1 does not occur, the incident wavelength range in which the reflectance becomes 1.5 or less will be narrowed.

On the other hand, for example, as shown in the data on the right side of the table in FIG. 3 ("improved film laminated structure"), the laminated positions of the antireflection film and the transparent conductive film in the general film laminated structure are reversed, thus forming an improved film laminated structure having the same laminated structure as above in which an antireflection film is provided on the transparent conductive film. Namely, on a glass lens (TAF1) having a refractive index of 1.77 there is formed an ITO having a refractive index of 1.74 and a thickness of 25.00 nm, and there is provided a laminated structure (here is a 6-layer structure) formed by alternately laminating i) an $Al_2O_3$ layer, which is the first antireflection film material having a refractive index of 1.64 and ii) an $LaTiO_3$ layer, which is the second antireflection film material having a refractive index of 2.10, higher than that of $Al_2O_3$ layer. In detail, there have been laminated antireflection films including (in the following order from below) an antireflection layer ($Al_2O_3$) having a thicknesses of 29.49 nm, an antireflection layer ($LaTiO_3$) having a thickness of 15.99 nm, an antireflection layer ($Al_2O_3$) having a thickness of 37.99 nm, an antireflection layer ($LaTiO_3$) having a thickness of 62.94 nm, and antireflection layer ($Al_2O_3$) having a thickness of 62.26 nm, an antireflection layer ($LaTiO_3$) having a thickness of 48.65 nm. Further, on the antireflection films there is provided a protective film made of $SiO_2$ having a thickness of 85.39 nm and having a refractive index of 1.45, thereby forming a film laminated structure. Meanwhile, when an optimization was performed by a predetermined simulation at a predetermined light incident angle, the spectral characteristic curve L3 was obtained which is shown in the spectral characteristic diagram of FIG. 4.

As can be seen from the spectral characteristic curve L3, in this improved film laminated structure in which the antireflection film is located on the transparent conductive film, the reflectance is completely reduced to 1.5 or less within the specified incident wavelength range (400 nm to 700 nm), while the spectral characteristic curve L3 does not have a convex portion where the reflectance increases in the central region of the specified incident wavelength range (400 nm to 700 nm), thus obtaining a spectral characteristic which is close to the spectral characteristic (spectral characteristic curve L2) of the antireflection film alone that has not been covered by the transparent conductive film.

A difference in reflectance (spectral characteristics) between the general film-laminated structure and the improved film-laminated structure is caused due to a difference in the refractive index between the transparent conductive film that contacts the antireflection film from one side of the laminated structure and a material that is bordering with the transparent conductive film (particularly, in contact with a boundary between the transparent conductive film and its lower layer). Specifically, in a general film laminated structure, between a transparent conductive film (ITO film) having a refractive index of 1.74 and a protective film ($SiO_2$) having a refractive index of 1.45 which is adjacent to and beneath the transparent conductive film (ITO film), there is a difference of 0.29 in their refractive indexes which is so large that can be considered to be a cause of increasing the reflectance of the antireflection film located as the lower layer. On the other hand, in the improved film laminated structure, the difference in the refractive index between the ITO film having a refractive index of 1.74 and the glass lens having a refractive index of 1.77 which is adjacent to and beneath ITO film is as small as 0.03. At the same time, among the ITO film and the layer adjacent to and above the ITO film, i.e., among the first and second antireflection film materials forming the laminated structure there is $Al_2O_3$ layer which is the first antireflection film material having a low refractive index of 1.64, with a refractive index difference between $Al_2O_3$ layer and ITO film being as small as 0.1 (which is considerably small as compared to a refractive index difference of 0.36 between the refractive index 2.10 of the second antireflection film material ($LaTiO_3$) having a relatively high refractive index and the refractive index 1.74 of ITO. It can be considered that the initial low reflectance of the antireflection film is being maintained.

Therefore, when the first antireflection film material and the second antireflection film material having different refractive indexes are alternately laminated to form a laminated structure, it is preferable that the refractive index of the transparent conductive film (it is allowable that transparent conductive film may be inserted in the middle of the laminated structure) adjacent to and beneath this laminated structure be set as follows. Namely, it is preferable that the refractive index of the transparent conductive film be closer to the refractive index of the second antireflection film material or the first antireflection film material that is located on and adjacent to the transparent conductive film than the refractive index of the first antireflection film material or the second antireflection film material that is not located on and adjacent to the transparent conductive film. Further, it is preferable that the refractive index of the transparent conductive film be closer to the refractive index of the lens located closest to the object side and beneath the transparent conductive film, than the refractive index of the antireflection film material located on and adjacent to the transparent conductive film.

As described above, the inventors of the present inventors have arrived at the following conclusion. Namely, by adopting a film laminated structure in which an antireflection film is provided on the transparent conductive film, it is possible to warm the lens surface to effect a quick snow melting, without impairing the antireflection characteristics of the antireflection film (while making the best use of the antireflection characteristics of the antireflection film).

In the above configuration, it is preferable that the antireflection film contains a metal. If the antireflection film contains metal in this way, even if an antireflection film is provided on the transparent conductive film to cover the conductive film, it is still possible for Joule heat generated by the transparent conductive film to be transferred to the outer surface through the antireflection film, thereby achieving a desired snow melting effect. In any case, in the present invention, a transparent conductive film having an electric resistance is provided on the lens surface facing the object side of the lens located closest to the object side, and a current is passed to the transparent conductive film through the electrodes, thereby generating a Joule heat on the lens surface. Namely, since the lens surface is directly warmed by the lens heating means having the transparent conductive film and the electrodes, it is possible to quickly resolve a deterioration in the visibility of the lens in a cold area (which will otherwise be caused due to the freezing of the lens and snow accretion on the lens, thus effecting a quick snow melting and the like, thereby ensuring a desired visibility in a short time. Further, since the conductive film is transparent, it does not unfavorably affect the visibility of the lens unit. Moreover, since the transparent conductive film is simply provided on the lens surface and the electrodes are electrically connected to the transparent conductive film, it is possible to suppress an increase in manufacturing cost to a low level as compared with a case where a cover glass with a heater or a fan is installed. Meanwhile, since almost no new space is required to install the lens heating means, it is possible to maintain almost the same size as a conventional lens unit not including the lens heating means (it is not necessary to increase the size of an entire lens unit). The effect obtained in this way is particularly beneficial when the lens located closest to the object side is a glass lens having a low thermal conductivity.

Regarding the above configuration, we can give an example in which the above-mentioned indium tin oxide (ITO) is used as a transparent conductive film, but this should not become any limitation to the present invention. Further, the transparent conductive film needs to be provided at least over the entire effective diameter range of the lens, and may also be provided over the entire surface of the lens. On the other hand, it is preferable that the electrodes are provided outside the range of the effective diameter of the lens so as not to obstruct the field of view for the lens. Here, the range of the effective diameter of the lens corresponds to a lens region through which the light incident on the image sensor (imaging element) of the lens unit passes, and is defined by the size of the imaging element. Further, it is possible to use, as an electrode, a metal electrode, such as silver or copper electrode. Preferably, the thickness of the transparent conductive film is, for example, 10-50 nm, and the resistance value between the electrodes is set to 50-200Ω.

Further, in the above configuration of the present invention, it is preferable that a protective film be provided on the antireflection film, as shown in the above-mentioned example of the film laminated structure. If such a protective film is provided, it is possible to prevent a damage to the antireflection film having a weak strength, to inhibit a corrosion of the electrodes located beneath the antireflection film, thereby avoiding a deterioration of the electrodes. In addition, it is also possible to provide a water-repellent film serving as such a protective film. According to this, it is possible to realize a lens having both antireflection characteristics and water repellent property in addition to the lens heating function. At this time, it is preferable that the water-repellent film be provided over the entire surface of the lens in order to enhance the water-repellent performance.

Moreover, the camera module according to the present invention is characterized by including the lens unit described above.

By virtue of such a configuration, it is possible to obtain the effects of the lens unit described above by using the afore-mentioned camera module.

Effects of Invention

According to the present invention, since the antireflection film is provided on the transparent conductive film, it is possible to warm the lens surface to effect a quick snow melting, without impairing the antireflection characteristics of the antireflection film (while making the best use of the antireflection characteristics of the antireflection film).

DESCRIPTION OF THE DRAWINGS

FIG. 1 is a schematic cross-sectional view of a lens unit according to an embodiment of the present invention in which an antireflection film is provided on a transparent conductive film.

FIG. 2 is a schematic cross-sectional view of a camera module including the lens unit of FIG. 1.

FIG. 3 is a table showing detailed data of a single laminated structure of the antireflection film, a general film laminated structure, and an improved film laminated structure.

FIG. 4 is a spectral characteristic diagram of laminated structures indicated in FIG. 3.

FIG. 5 is a schematic cross-sectional view of a lens unit in which a transparent conductive film is provided on an antireflection film.

DESCRIPTION OF EMBODIMENTS

Hereinafter, description will be given to the embodiments of the present invention with reference to the accompanying drawings.

Here, the lens unit of the present embodiment is particularly for use in a camera module such as an in-vehicle camera. For example, the lens unit is fixedly installed on the outer surface side of an automobile, and the wiring is drawn into the automobile to be connected to a display or other devices. In FIGS. 1, 2 and 5, hatching is omitted in a plurality of lenses.

FIG. 1 shows a lens unit 11 according to the first embodiment of the present invention. As shown in the figure, the lens unit 11 of the present embodiment has, for example, a cylindrical lens barrel 12 made of a resin (which may also be made of a metal) and a plurality of lenses which are, for example, five lenses including a first lens 13, a second lens 14, a third lens 15, a fourth lens 16, and a fifth lens 17 arranged from the object side, as well as two throttle members 22*a*, 22*b*, all received within a stepped inner accommodation space S of the lens barrel 12. In the present embodiment, the throttle members 22*a*, 22*b* are interposed between the second lens 14 and the third lens 15, as well as between the third lens 15 and the fourth lens 16, serving as an "aperture throttle" that limits an amount of transmitted light and determines an F value that is an index of brightness, or serving as a "light-shielding aperture" that blocks light rays which may cause ghosts and light rays which may cause aberrations. An in-vehicle camera having such a lens unit 11 includes a lens unit 11, a substrate having an image sensor (not shown), and an installation member (not shown) for installing the substrate in a vehicle such as an automobile.

A plurality of lenses 13, 14, 15, 16 and 17 to be incorporated and held in the inner accommodation space S of the lens barrel 12 are stacked and arranged with their respective optical axes being aligned with one another. Here, the respective lenses 13, 14, 15, 16, 17 are arranged along one optical axis O to form a lens group L for use in imaging. In this case, the first lens 13 located closest to the object side and partially constituting the lens group L is a spherical glass lens having a convex surface on the object side and a concave surface on the image side, while other lenses 14, 15, 16, 17 are resin lenses. However, the present invention is not limited to this (for example, the first lens 13 may also be a resin lens). Further, if necessary, the lenses 13, 14, 15, 16 and 17 are provided on their respective surfaces with an antireflection film, a hydrophilic film, a water repellent film or the like. Particularly, in the present embodiment, on the lens surface 13*a* facing the object side of the first lens 13 which is a glass lens, as will be described later, there have been provided a transparent conductive film 31, at least a pair of electrodes 32A, 32B electrically connected to the transparent conductive film 31, an antireflection film 30, as well as a water repellent film 33 serving as a protective film.

Further, in the present embodiment, the fourth and fifth lenses 16, 17 located on the image side together form a combined lens (mutually bonded lens) 40. As shown in the figure, the fourth and fifth lenses 16, 17 constituting such a bonded lens 40, can be assembled together in the way described below, i.e., an annular convex portion 16*a* of the surface facing the image side of the fourth lens 16 located on the object side is fitted with a corresponding annular recess 17*a* of the surface facing the object side of the fifth lens 17 located on the image side, followed by being fixed together using an adhesive or the like.

Further, in the present embodiment, an O-ring 26 serving as a seal member is inserted between the first lens 13 located closest to the object side and the lens barrel 12, thus preventing water and dust from invading into the lens group L inside the lens barrel 12. In this case, a stepped diameter-reduced portion 13*d* having a smaller diameter at the image-side portion of the lens 13 is formed on the outer peripheral side surface 13*c* of the first lens 13, and the O-ring 26 is attached to the reduced-diameter portion 13*d*. The O-ring 26 is compressed in the radial direction between the outer peripheral side surface 13*c* of the first lens 13 and the inner peripheral surface of the lens barrel 12, so that the object-side end of the lens barrel 12 can be kept in a sealed state.

Inside the lens barrel 12 there is provided a cylindrical inner wall 12*b* on the object side, while a groove is formed between the inner wall 12*b* and the outer wall 12*a*, and an annular body 27 is provided in the groove, with the O-ring 26 being in close contact with the annular body 27. A reason as to why the groove is formed between the inner wall 12*b* and the outer wall 12*a* can be explained as follows. Namely, if there is no such a groove, the inner wall 12*b* and the outer wall 12*a* will be integrated together, the wall thickness will become thicker. Thus, the formation of the groove can inhibit a large sink mark from occurring and prevent a dimensional accuracy from being deviated at the time the resin lens barrel 12 is molded and cooled. The annular body 27 is composed of a substance having relatively soft elasticity, and for example, Teflon may be used to form such an annular body. Here, the annular body 27 has a function of supporting the O-ring 26 in the optical axis direction. Since the annular body 27 is a member separated from the lens barrel 12, it is possible to change the height of the annular body 27 according to the size of the O-ring 26, thus ensuring that the O-ring 26 provides a sealing effect using an appropriate elastic force.

Further, regarding the lens barrel 12, with the lens group L being accommodated and held in the inner accommodation space S, the crimped portion 23 at the end (upper end in FIG. 1) on the object side of the lens barrel 12 is radially inward crimped, so that the first lens 13 located on the object side of the lens group L is fixed to the object side end of the lens barrel 12 by the crimped portion 23.

However, the fixing of the first lens 13 is not limited to the crimped portion 23, and it is also possible to fix the first lens 13 at a fixing portion attached to the end portion of the lens barrel 12 on the object side after the lenses 13, 14, 15, 16 and 17 have been received into the lens barrel 12.

Moreover, an inner flange portion 24 with an opening having a diameter smaller than that of the fifth lens 17 is provided at the image-side end portion (lower end portion in FIG. 1) of the lens barrel 12. By virtue of the inner flange portion 24 and the crimped portion 23, it is possible to hold and fix the plurality of lenses 13, 14, 15, 16, 17 (forming the lens group L) and the throttle members 22*a*, 22*b* in the lens barrel 12 in the optical axis direction.

Further, FIG. 2 is a schematic cross-sectional view of the camera module 300 of the present embodiment which includes the lens unit 11 having the above configuration. As shown in the figure, the camera module 300 includes the lens unit 11 of FIG. 1 into which the filter 100 has been attached.

The camera module 300 includes an upper case (camera case) 301 which is an exterior component, and a mount (pedestal) 302 that holds the lens unit 11. Further, the camera module 300 includes a seal member 303 and a package sensor (imaging element) 304.

The upper case 301 is a member that is engaged with a flange portion 25 provided in a flange shape on the outer peripheral surface 12*a* of the lens barrel 12 and exposes the end portion of the lens unit 11 to the object side, but covers other portions. The mount 302 is positioned inside the upper case 301 and has a female screw 302*a* that is screwed with the male screw 11*a* of the lens unit 11. The seal member 303 is a member inserted between the inner surface of the upper case 301 and the outer peripheral surface 12*a* of the lens barrel 12 of the lens unit 11, and is a member for maintaining the airtightness inside the upper case 301.

The package sensor 304 is disposed inside the mount 302 and is located at a position where it receives an image of an object formed by the lens unit 11. Further, the package sensor 304 has a transparent cover on the outside and also has CCD, CMOS, or the like inside the package sensor 304, thus converting the light collected and arriving through the lens unit 11 into an electric signal. The converted electrical signal is then converted into analog data or digital data, which are components of image data captured by the camera.

Moreover, as shown in FIGS. 1 and 2, the first lens 13 which is a glass lens provided at the end portion of the lens barrel 12 on the object side, includes the lens surface 13*a* facing the object side and a lens back surface 13*b* facing the image side. Particularly, in the present embodiment, the first lens 13 is formed so that the lens surface 13*a* on the object side has a convex shape and the back surface 13*b* of the lens on the image side has a concave shape in cross-sectional view.

Further on the lens surface 13*a* of the first lens 13 there is provided a transparent conductive film 31 made of, for example, indium tin oxide (ITO) by vapor deposition or the like, with the conductive film having a thickness of, for example, 10-50 nm or less. If the thickness of the transparent conductive film 31 is 50 nm or more, the spectral characteristics of the film will deteriorate and the light transmittance will decrease. On the other hand, if the thickness of the transparent conductive film 31 is less than 10 nm, the resistance of the transparent conductive film 31 will become too high to function as a heater. Nevertheless, it should be noted that such a transparent conductive film 31 needs to be provided at least over the entire effective diameter range of the first lens 13. Therefore, in the present embodiment, as an example, the transparent conductive film 31 is provided over the entire lens surface 13*a*. Here, the range of the effective diameter of the lens corresponds to the region of the lens 13 through which the light incident on the package sensor 304 passes, and is defined by the size of the package sensor 304.

Moreover, at least a pair of electrodes 32 electrically connected to the transparent conductive film 31 are provided on the transparent conductive film 31. Particularly, in the present embodiment, a pair of arcuate electrodes 32A, 32B are provided in mutually facing state on the transparent conductive film 31 over the outer periphery of the lens surface 13*a*. Of course, the number of electrode pairs can be set arbitrarily, and the arrangement position and shape of the electrodes can also be set arbitrarily. However, in the present embodiment, the electrodes 32A, 32B, as described above, are provided on the outer periphery of the lens surface 13*a*, outside the range of the effective diameter of the lens, in a manner such that the electrodes 32A, 32B will not obstruct the field of view for the lens.

Moreover, although not shown, electrical wiring extending from a power source (not shown) is electrically connected to the pair of electrodes 32A, 32B, so that a voltage may be applied between the electrodes 32A, 32B and an electric current can flow through the transparent conductive film 31, thereby forming desired lens heating means 48 that generates Joule heat on the lens surface 13*a*. On the other hand, it is possible to use a metal such as silver, copper, or nickel as an electrode.

Further, on the transparent conductive film 31 there is provided an antireflection film 30 for inhibiting a reflection of an incident light. Particularly, in the present embodiment, the antireflection film 30 containing a metal is formed by virtue of vapor deposition or the like over the entire lens surface 13*a* to completely cover the electrodes 32A, 32B (Namely, the antireflection film 30 is formed to cover the lens heating means 48, with the electrodes 32A, 32B being interposed between the transparent conductive film 31 and the antireflection film 30). In this way, the antireflection film 30 is thus provided on the upper layer of the transparent conductive film 31 instead of the lower layer. Further, a protective film (water repellent film) 33 is provided on the antireflection film 30. Specifically, the first lens 13, the transparent conductive film 31, the antireflection film 30, and the protective film (water repellent film) 33 together form an "improved film laminated structure" of FIG. 3 described above. Namely, the antireflection film 30 has a laminated structure in which a first antireflection film material ($Al_2O_3$) and a second antireflection film material ($LaTIO_3$) having different refractive indexes are alternately laminated to form the laminated structure. Here, the refractive index of the transparent conductive film 31 is closer to the refractive index of the first antireflection film material located on and adjacent to the transparent conductive film 31 than the refractive index of the second antireflection film material not located on and adjacent to the transparent conductive film 31, and is closer to the refractive index of first lens 13 than the refractive index of the first antireflection film material located on and adjacent to the transparent conductive film 31.

As described above, according to the present embodiment, since the antireflection film 30 is provided on the transparent conductive film 31, based on the detailed reasons described above, it becomes possible to warm the surface of the lens 13 (while making the full use of the antireflection characteristics of the antireflection film 30) to realize a quick snow melting effect and the like, without impairing the antireflection characteristics of the antireflection film 30. Further, according to the present embodiment, since the antireflection film 30 contains a metal, even if the antireflection film 30 is provided on the transparent conductive film 31 to cover the transparent conductive film 31 as in the present embodiment, it is still possible to transfer the Joule heat generated by the transparent conductive film 31 to the outer surface of the antireflection film 30 (through the antireflection film 30), thereby realizing a desired snow melting effect.

However, the present invention is not limited to the above-described embodiments, but can be variously modified when being implemented without departing from the gist thereof. For example, in the present invention, the shapes of the lens, the lens barrel and the like, the antireflection film, the water-repellent film, and the transparent conductive film are not limited to the above-described embodiments. Further, it is possible to arbitrarily set film material, film thickness, electrode and lens materials, their arrangement forms, and the like including the first antireflection film material and the second antireflection film material. Moreover, the electrodes do not have to be arcuate, and are allowed not to be provided on the outer periphery of the lens. In addition, the transparent conductive film is not limited to ITO.

EXPLANATIONS OF REFERENCE NUMERALS

11 lens unit
12 lens barrel
13 first lens
13*a* lens surface
30 antireflection film
31 transparent conductive film
32A, 32B electrodes
33 water repellent film (protective film)
48 lens heating means
300 camera module
L lens group
O optical axis

The invention claimed is:

1. A lens unit including i) a lens group in which a plurality of lenses are arranged along optical axes of the lenses and ii) a lens barrel in which the lens group is accommodated, said lens unit comprising:

lens heating means which includes: i) a transparent conductive film provided on an object-side surface of a lens, among the plurality of lenses, that is located closest to an object side of the lens group, and ii) only one pair of electrodes electrically connected to the transparent conductive film, the electrodes facing each other on an outer periphery of the transparent conductive film, all of the electrodes being outside of a range of an effective diameter of the lens such that a field of view for the lens is not obstructed by any electrode, wherein the electrodes are configured to allow an electric current to flow to the transparent conductive film by application of a voltage between the electrodes to generate Joule heat on the object-side surface; and an antireflection film provided to cover the lens heating means, the electrodes being interposed between the transparent conductive film and the antireflection film.

2. The lens unit according to claim 1, wherein the antireflection film is provided on the transparent conductive film.

3. The lens unit according to claim 1, wherein a protective film is provided on the antireflection film.

4. The lens unit according to claim 2, wherein the antireflection film has a laminated structure in which a first antireflection film material and a second antireflection film material having different refractive indexes are alternately laminated, and the refractive index of the transparent conductive film is closer to the refractive index of the second antireflection film material or the first antireflection film material located on and adjacent to the transparent conductive film than the refractive index of the first antireflection film material or the second antireflection film material not located on and adjacent to the transparent conductive film.

5. The lens unit according to claim 4, wherein the refractive index of the transparent conductive film is closer to the refractive index of the lens located closest to the object side than the refractive index of the antireflection film material located on and adjacent to the transparent conductive film.

6. The lens unit according to claim 1, wherein the antireflection film contains a metal.

7. The lens unit according to claim 1, wherein the lens located closest to the object side is a glass lens.

8. A camera module characterized by including a lens unit recited in claim 1.

* * * * *